(12) United States Patent
Eberle

(10) Patent No.: US 7,965,929 B2
(45) Date of Patent: Jun. 21, 2011

(54) HEAT RECOVERY DEVICE

(75) Inventor: Giorgio Eberle, Pieve di Soligo (IT)

(73) Assignee: Giorgio Eberle, Pieve Di Soligo (IT)

( * ) Notice: Subject to any disclaimer, the term of this patent is extended or adjusted under 35 U.S.C. 154(b) by 685 days.

(21) Appl. No.: 12/076,282

(22) Filed: Mar. 17, 2008

(65) Prior Publication Data

US 2008/0240692 A1  Oct. 2, 2008

(30) Foreign Application Priority Data

Mar. 27, 2007 (IT) .............................. TV2007A0052

(51) Int. Cl.
*F24H 1/18* (2006.01)

(52) U.S. Cl. .................... 392/449; 392/441; 392/451

(58) Field of Classification Search .................. 392/449, 392/441, 451
See application file for complete search history.

(56) References Cited

U.S. PATENT DOCUMENTS

| | | | |
|---|---|---|---|
| 3,263,242 A * | 8/1966 | Will .................................. 4/598 |
| 3,946,802 A * | 3/1976 | Christenson .................. 165/297 |
| 4,150,787 A * | 4/1979 | Braathen ........................ 237/1 R |
| 4,207,752 A * | 6/1980 | Schwarz ........................ 62/238.6 |
| 4,291,423 A * | 9/1981 | Wilson .............................. 4/598 |
| 4,300,247 A * | 11/1981 | Berg .................................. 4/598 |
| 4,304,292 A * | 12/1981 | Cardone et al. ................. 165/47 |
| 4,372,372 A * | 2/1983 | Hunter ............................. 165/47 |
| 4,398,308 A * | 8/1983 | Berg .................................. 4/598 |
| 4,422,932 A | 12/1983 | Kalberer |
| 4,529,032 A * | 7/1985 | Molitor .......................... 165/301 |
| 4,786,407 A * | 11/1988 | Ljubarsky et al. ............. 210/178 |
| 4,821,793 A * | 4/1989 | Sheffield .......................... 165/47 |
| 5,143,149 A * | 9/1992 | Kronberg ....................... 165/300 |
| 5,301,745 A * | 4/1994 | Seib et al. ......................... 165/47 |
| 5,443,041 A * | 8/1995 | Folsom et al. ................. 122/379 |
| 5,736,059 A * | 4/1998 | Mackelvie ..................... 210/774 |
| 5,838,879 A * | 11/1998 | Harris ............................ 392/451 |
| 6,546,568 B1 * | 4/2003 | Schuster ........................... 4/353 |
| 7,849,530 B2 * | 12/2010 | Hendricks ......................... 4/596 |
| 2002/0179514 A1* | 12/2002 | Anderson et al. ............. 210/258 |

FOREIGN PATENT DOCUMENTS

| | | |
|---|---|---|
| AT | 380 329 B | 5/1986 |
| AT | 411 608 B | 3/2004 |
| CH | 598 556 A5 | 4/1978 |
| DE | 29 05 251 A1 | 10/1979 |
| DE | 29 19 004 A1 | 11/1980 |
| DE | 33 16 704 A1 | 12/1983 |
| DE | 43 37 744 A1 | 5/1995 |

* cited by examiner

*Primary Examiner* — Thor S Campbell
(74) *Attorney, Agent, or Firm* — Modiano & Associati; Albert Josif; Daniel J. O'Byrne

(57) ABSTRACT

A heat recovery device particularly for association downstream of devices suitable to heat water. The device is constituted by a tank provided with an inlet for recovering warm water from domestic drains and an outlet for draining toward the sewer. The tank has a set of tubes for water which arrives from the mains and is thus heated before being fed to devices such as a boiler, water heater, et cetera. The device therefore allows savings in water heating for domestic or industrial uses.

20 Claims, 7 Drawing Sheets

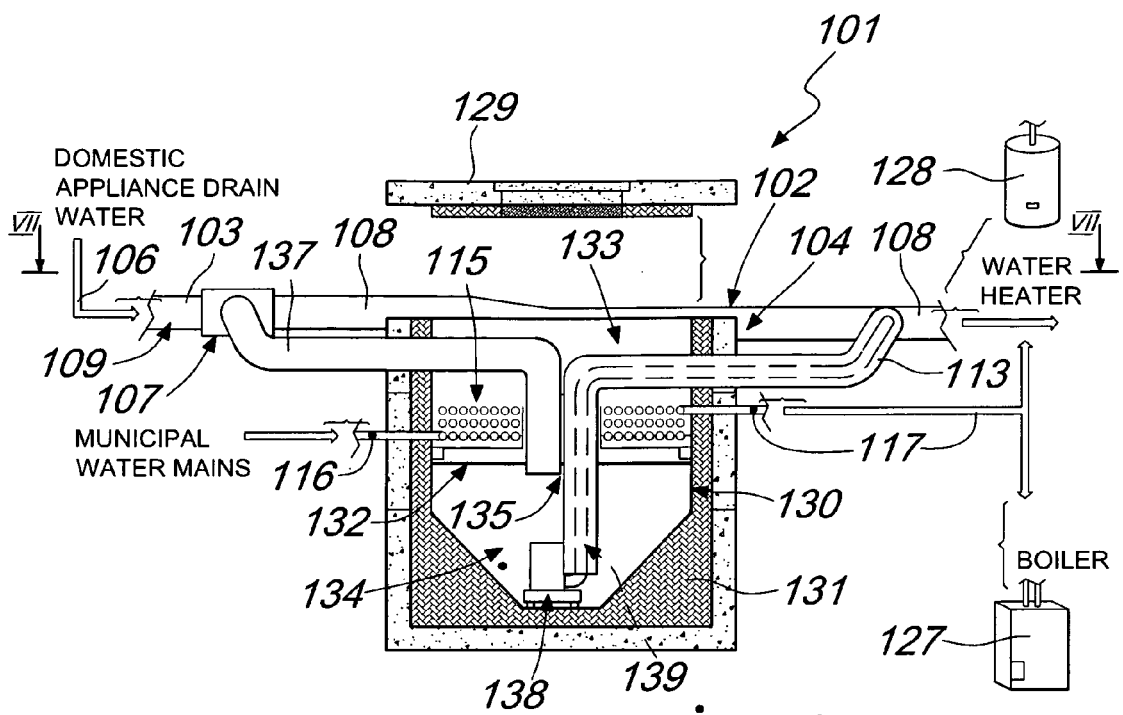
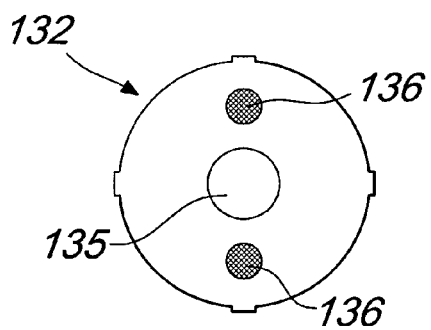
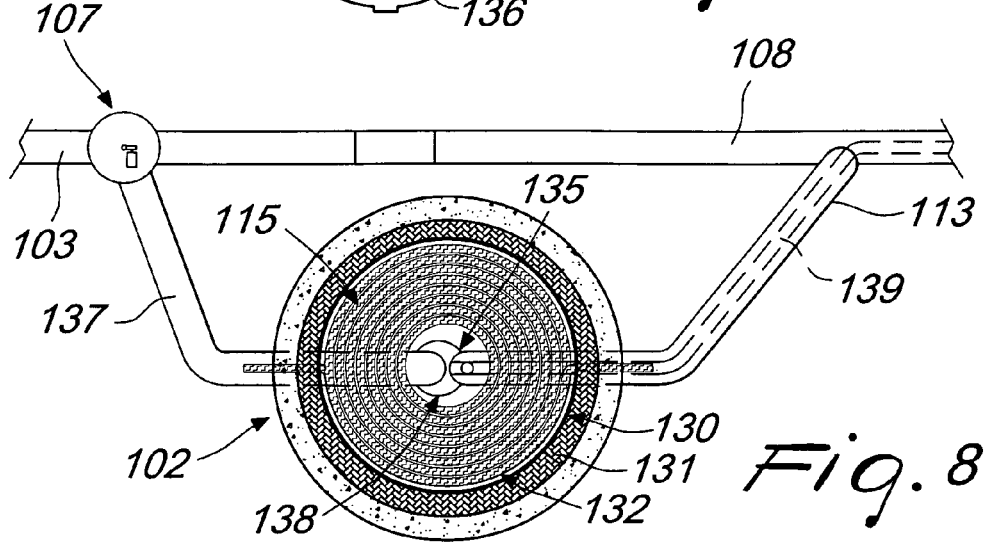

HEAT RECOVERY DEVICE

The present invention relates to a heat recovery device which can be used to reduce energy consumption in the heating of sanitary water or also for industrial uses.

BACKGROUND OF THE INVENTION

Currently it is known to use various domestic appliances, such as dishwashers, washing machines, showers, various sinks, et cetera, which dispense water which is heated beforehand for example by a boiler for the various domestic uses.

The appliances designed to heat the water to the temperature set by the user, such as for example boilers, burn a certain amount of fuel or use electric power, and so do washing machines or dishwashers which use their own electrical resistance heaters, the energy consumption of which is higher than the heating that can be obtained with a gas-, gas oil- or coal-fired boiler.

However, the hot water, which can reach even 90° in the case of the drain of a washing machine, 70° in the case of a dishwasher, 30° to 50° for a sink, 30° to 40° for a bathtub or shower, and 80° to 90° for a kitchen sink, once it has been used, is conveyed directly, through suitable pipes, to the soapy water drain, such water being then conveyed into a sewer drain.

Therefore, the use of these known domestic appliances requires a high level of energy resources to obtain hot water and at the same time entails the conveyance, after its use, of water which is still warm directly into the sewer drain and whose heat is thus dispersed into the environment.

SUMMARY OF THE INVENTION

The aim of the present invention is to solve the above mentioned problems, eliminating the drawbacks of the cited background art, by providing a device which allows to reduce energy consumption for using water in domestic appliances such as for example dishwashers, washing machines, showers, sinks, et cetera, or in industrial appliances and/or plants.

Within this aim, an object of the invention is to provide a device which allows to reduce, in boilers and water heaters or in other devices for heating water, the difference in temperature that occurs between the water that enters from the water mains and the value of the temperature desired in output, for example from the boilers or water heaters for domestic use in showers, sinks and optionally in dishwashers and washing machines.

Another object is to reduce the calories required to heat the water to the chosen temperature in domestic appliances such as showers, sinks and optionally dishwashers, washing machines, et cetera.

Another object is to provide a device which is structurally simple and at the same time has low manufacturing and maintenance costs.

This aim and these and other objects, which will become better apparent hereinafter, are achieved by a heat recovery device, characterized in that it is constituted by at least one thermally insulated tank provided with an inlet for recovering warm water from domestic drains, controlled by a first diverter valve which is controlled by a thermostat and is connected to the sewer, said at least one tank being provided with an outlet for draining toward the sewer which is controlled by a second quick-opening and quick-closing valve, a tube or a set of tubes being provided inside said tank for water which arrives from the mains or from a well to be sent to devices suitable to heat it, means for removing sediment from said tank and an overflow outlet being also provided.

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

BRIEF DESCRIPTION OF THE DRAWINGS

Further characteristics and advantages of the invention will become better apparent from the following detailed description of particular embodiments thereof, illustrated by way of non-limiting example in the accompanying drawings, wherein:

FIG. 6 is a view, similar to FIG. 1, of a second embodiment of the invention;

FIG. 7 is a top view of a stratification disk;

FIG. 8 is a sectional view of the invention, taken along the line VII-VII of FIG. 6;

DESCRIPTION OF THE PREFERRED EMBODIMENTS

Figure 1:
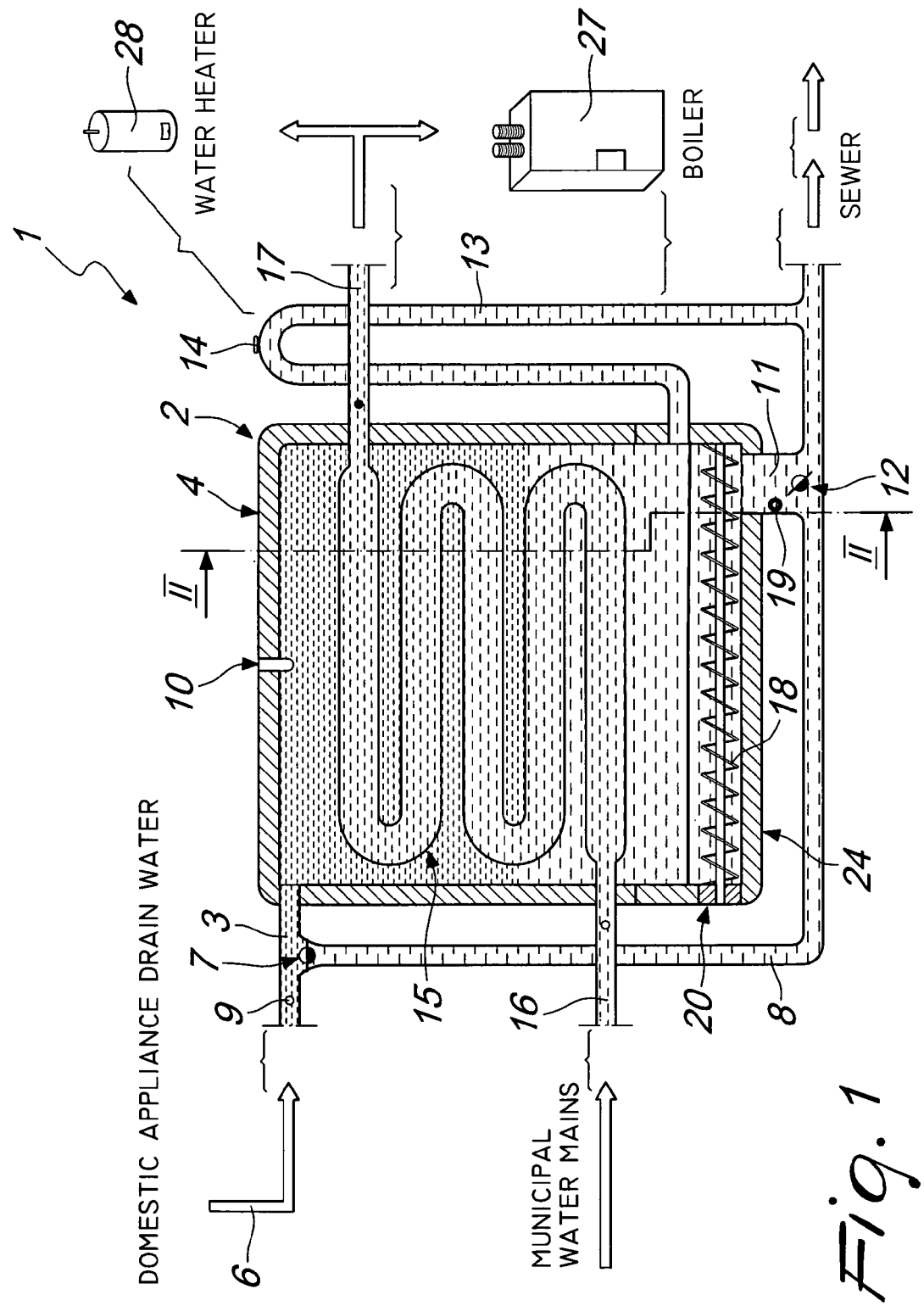
FIG. 1 is a sectional view of the device according to the invention, suitable to allow viewing of the components inside it and of the hydraulic connections in the operating condition in which the drain water from the domestic appliances has a higher temperature than the water accumulated in the tank.

With reference to the figures, the reference numeral 1 designates a device for recovering heat, in particular the heat that is present in the hot drain water produced by domestic appliances such as for example dishwashers 20, washing machines 21, showers 22, sinks 23 of various kinds and other industrial appliances.

Figure 2:
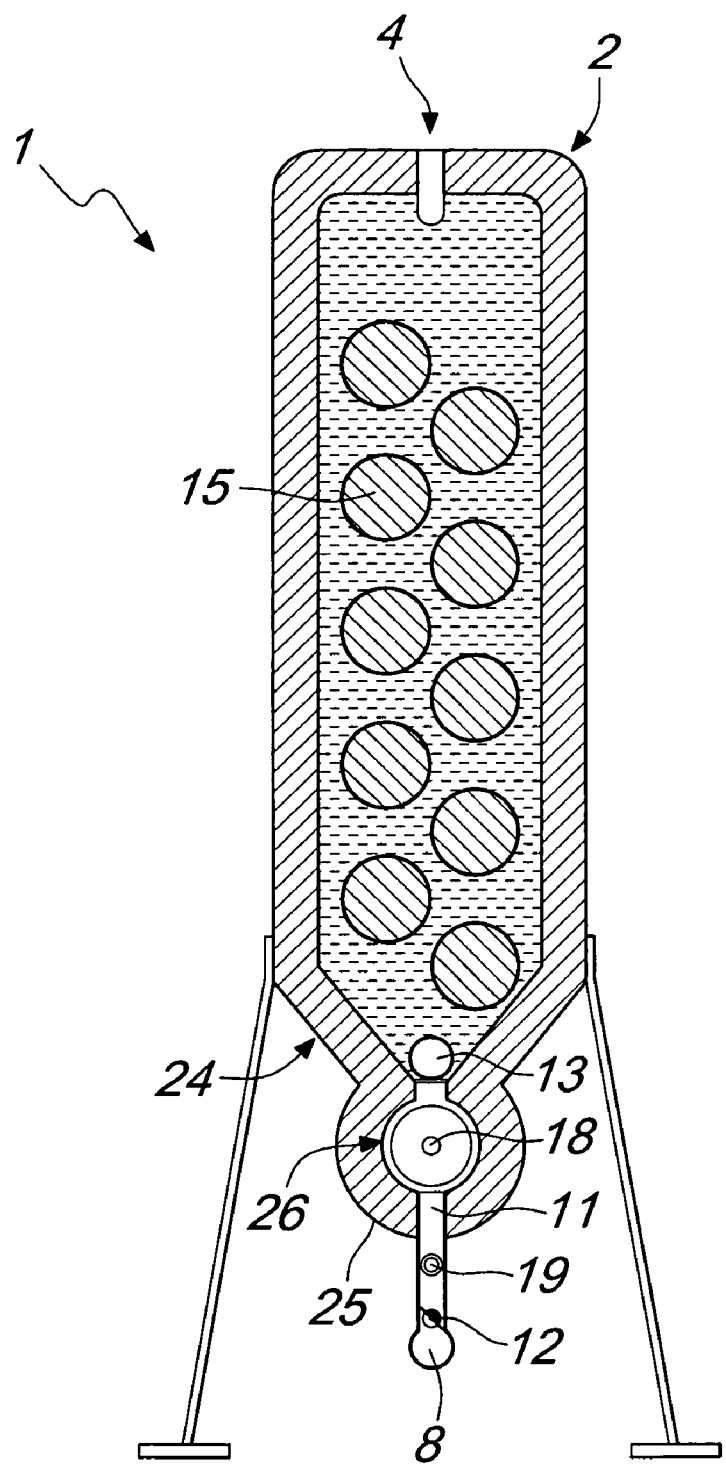
FIG. 2 is a sectional view, taken along the line II-II of FIG. 1.
Figure 3:
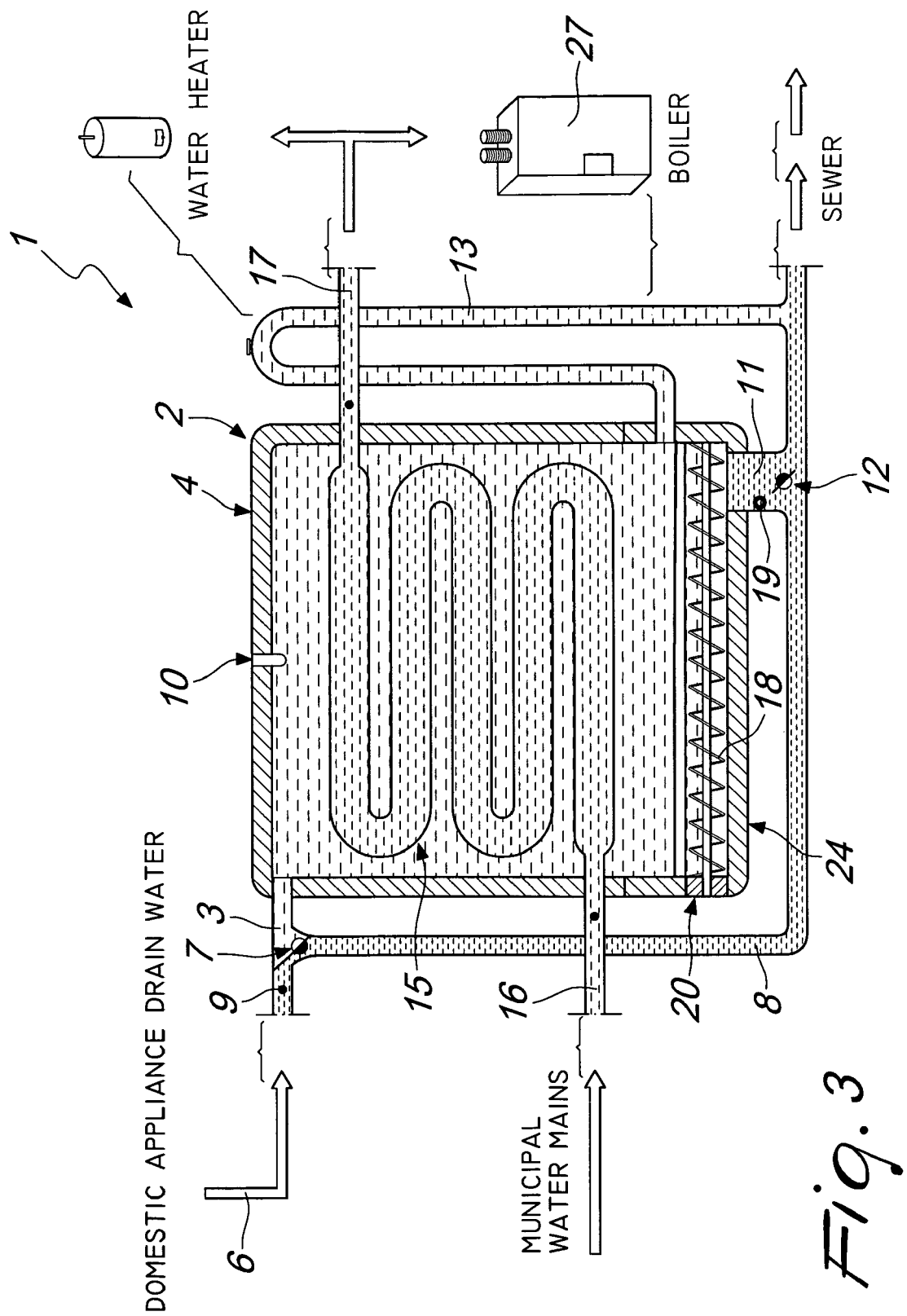
FIG. 3 is a view, similar to FIG. 1, of the device in the condition in which the drain water from the domestic appliances is at a lower temperature than the water accumulated inside the tank.

The device is constituted by at least one tank, designated by the reference numeral 2, of the advantageously thermally insulated type, which has a box-like shape whose lower end 24 has a preferably V-shaped transverse cross-section, as shown in FIG. 2, at the vertex of which there is a sleeve 25 axially to which there is a cylindrical seat 26.

The tank 2 is provided with a first inlet pipe 3, which is used to recover warm water from the drains of the domestic appliances 20, 21, 22 and 23 mentioned earlier, the inlet pipe 3 being located proximate to the upper end 4 of the tank 2.

Figure 4:
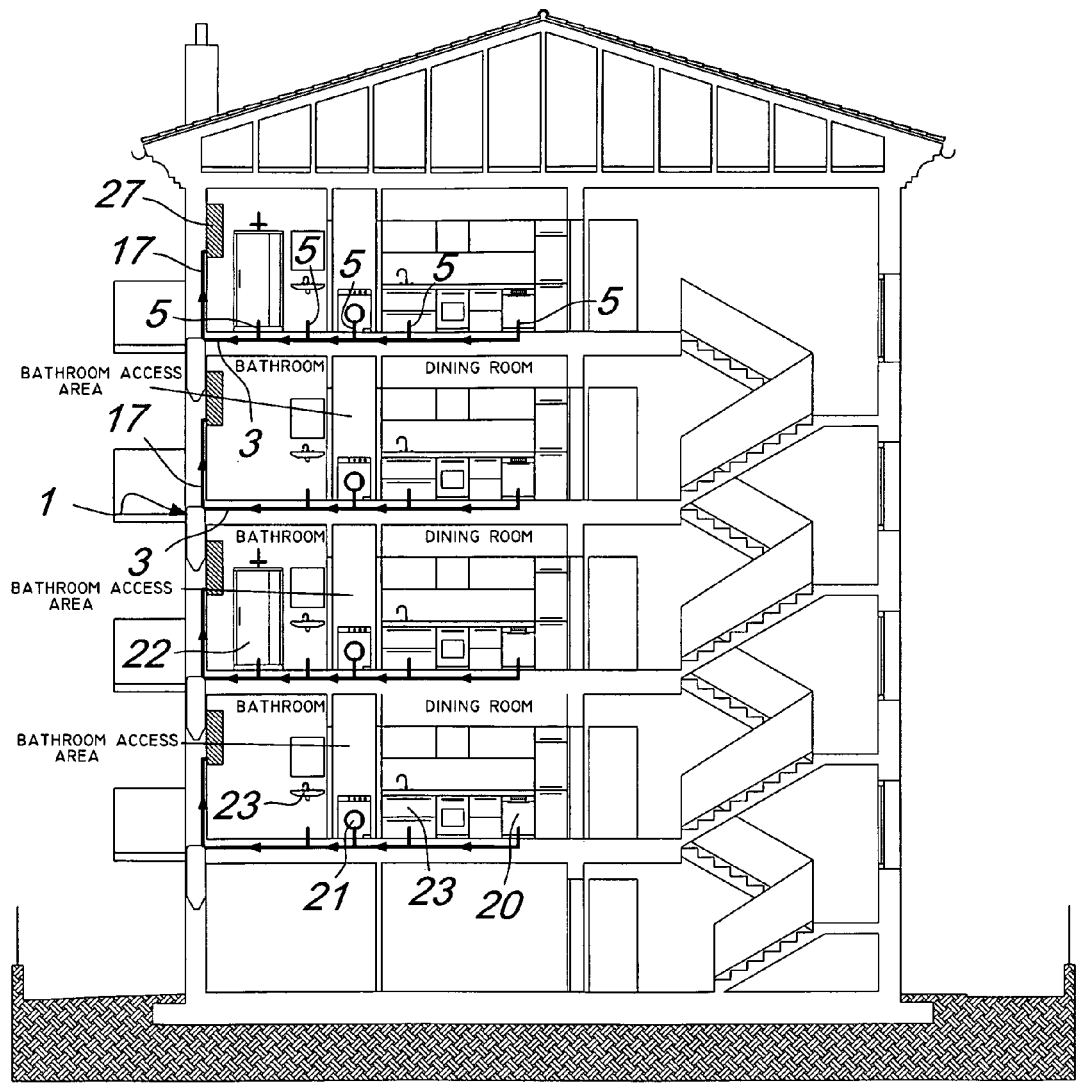
FIG. 4 is a partially sectional schematic view of a possible use of the device in a residential building provided with independent heating systems.
Figure 5:
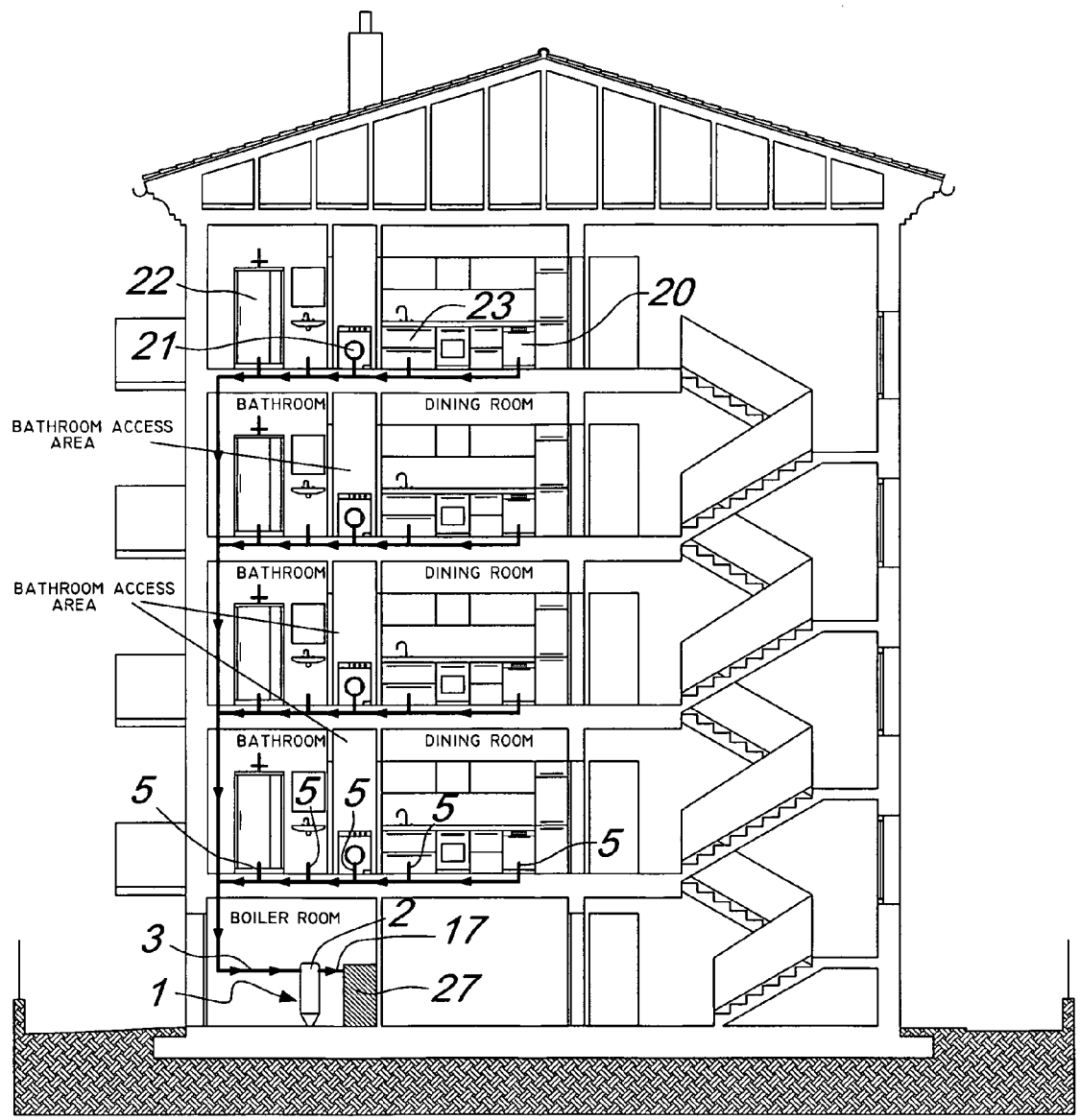
FIG. 5 is a view, similar to the preceding one, of the condition of application of the device in a residential building which uses a central heating system.
Figure 9:
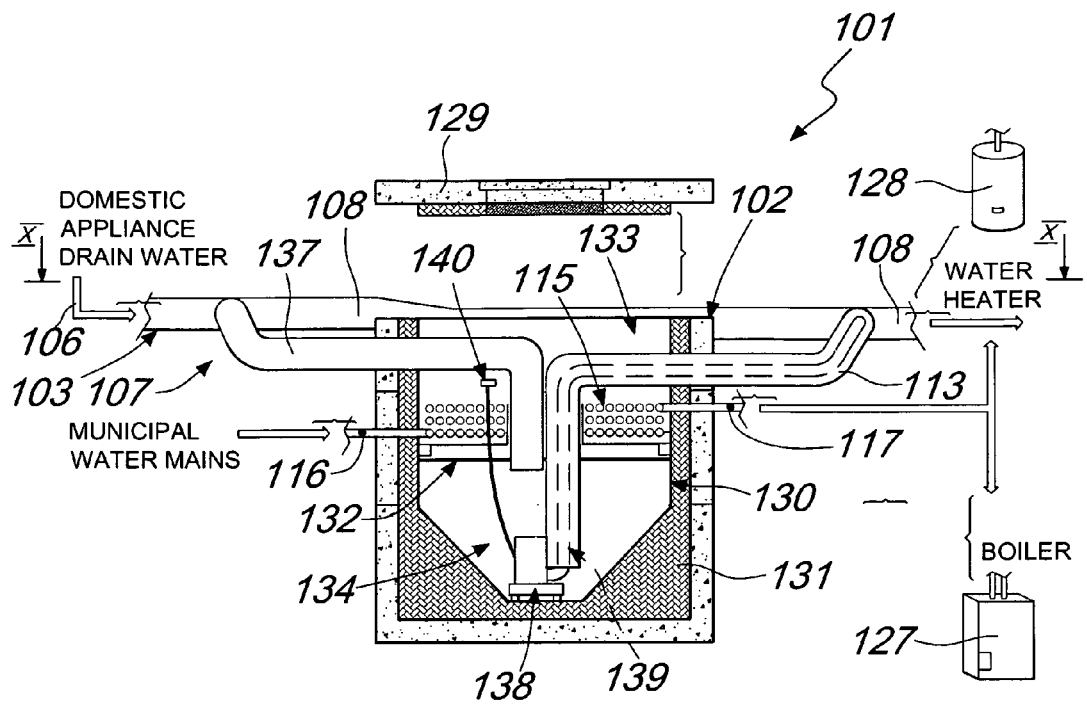
FIG. 9 is a view, similar to FIG. 6, of a third embodiment of the invention.
Figure 10:
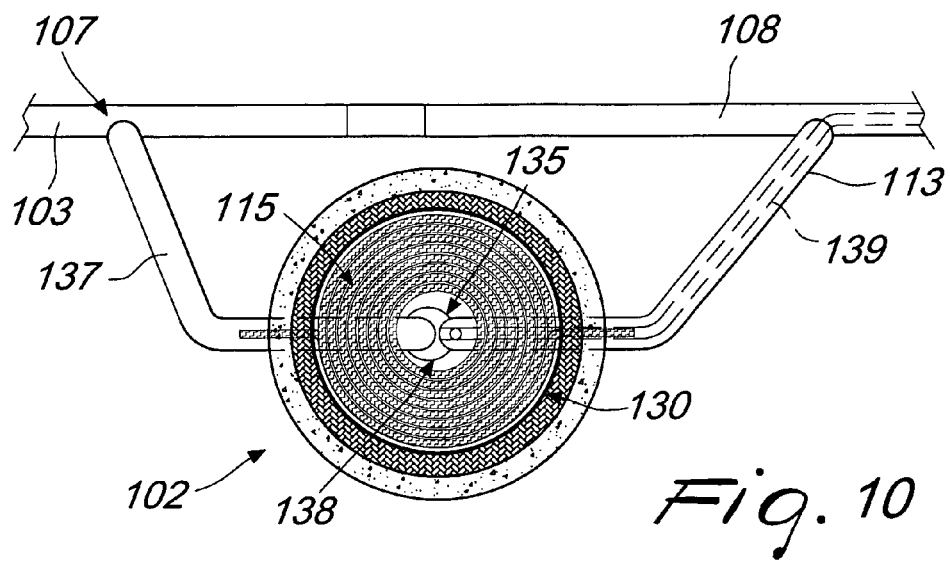
FIG. 10 is a sectional view of the invention, taken along the line X-X of FIG. 9.

The inlet pipe 3 can therefore be connected, upstream of the tank 2, to a series of drain pipes, designated for example by the reference numeral 5 in FIGS. 4 and 5, which in turn are connected to the drain of the mentioned showers 22, sinks 23, washing machine 21, dishwasher 20 and other industrial appliances.

The reference numeral 6 designates schematically the flow of the water that arrives from the drains 5 of the domestic appliances, said water being then conveyed at the first inlet pipe 3 to the tank 2.

At the first pipe 3, upstream of the inlet into the tank 2, there is a first diverter valve or diverter 7, which is suitable to allow either the passage of the flow 6 of water that arrives from the drains 5 of the domestic appliances into the tank 2 or its forced passage at a second pipe 8 for draining toward the sewer.

Activation of the first diverter valve 7 is controlled by an appropriately provided thermostatic sensor 9, which is arranged upstream of the first diverter valve 7 and whose function is to check the temperature of the flow 6 of water that arrives from the drains 5 of the domestic appliances in order to check whether it is at a higher or lower temperature than the water contained in the tank 2, which can be measured by means of an appropriately provided thermometer which can be arranged at a suitable trap 10 located at the upper end 4 of the tank 2.

When the temperature of the flow 6 of water that arrives from the drains 5 of the domestic or industrial appliances is higher than the temperature of the water contained in the tank 2, the first valve or diverter 7 forces the passage of the flow 6 directly into the tank, otherwise it divers the flow 6 at the second pipe 8 to the sewer.

The tank 2 further has, at the sleeve 25, an outlet drain 11, which is arranged advantageously at one side in the tank and is connected to the second pipe 8, which leads to the sewer with the interposition of a second quick opening and closure valve 12.

The tank further has, on the side and proximate to the outlet drain 11, a third pipe 13 of the overflow type that provides an overflow outlet, which therefore is substantially shaped like an inverted letter U whose ends are respectively connected to the inside of the tank 2 proximate to its lower end 24, but above the sleeve 25, and connected to the second pipe 8 connected to the sewer in a region downstream of the second valve 12.

A suitable plug 14 for inspection of the third pipe 13 is provided at the curved region of the third pipe 13.

Inside the tank 2 there is a tube or a set of tubes or a tube bundle or a coil 15, which has an intake 16, which is connected to the water mains or to a well and arranged preferably at a slightly higher level than the level of connection to the tank of the third pipe 13, and an outlet 17, which is connected to devices adapted to heat it, such as for example a boiler 27 or directly in a water heater 28 or in any case in other appliances which produce warm sanitary water.

Inside the tank 2 also advantageously removal means are provided for removing any sediment which might form therein, said removal means being arranged advantageously at the lower end of the tank and in particular at the cylindrical seat 26 formed in the sleeve 25 in a region, therefore, which lies below the set 15 and the connection of the third pipe 13.

Such removal means are constituted for example by a motorized worm screw 18, which is arranged axially with respect to the cylindrical seat 26, one end of the worm screw being arranged above the outlet drain 11 connected, through the second valve 12, to the second pipe 8 toward the sewer.

Activation of the worm screw 18 is achieved by means of a control element which is suitable to actuate the second valve 12, such as a rocker or proximity switch 19 of a known type, which is arranged within the outlet drain 11 upstream of the second valve 12.

The function of said element or rocker or proximity switch 19 is to detect the presence of any impurities which might deposit inside the tank 2 and are conveyed by the worm screw 18 at the outlet drain 11: when the rocker or proximity switch 19 detects the presence of these impurities, the second valve 12 is activated and causes a rapid opening and closure in order to generate in this way a flow of water toward the sewer so as to pour the impurities into it.

Use of the device is therefore as follows: the flow 6 of water that arrives from the drains 5 of the domestic or industrial appliances, usually at a still high temperature, instead of being conveyed directly into the sewer is conveyed into the tank 2 through the first pipe 3.

The thermostatic sensor 9 detects the temperature of the water of the flow 6: if the temperature of the water of said flow is lower or equal to the temperature of the water contained in the tank 2, the thermostatic sensor 9 provides clearance for the actuation of the first diverter valve 7, which conveys the flow 6 through the second pipe 8 directly to the sewer.

If instead the thermostatic sensor 9 detects a temperature of the flow 6 of the water that arrives from the drains 5 of domestic appliances at a higher temperature than the water contained in the tank 2, the thermostatic sensor 9 actuates the first valve 7 so as to convey the flow 6 directly into the tank 2.

The flow 6 thus enters the tank 2, transferring heat to the water that passes at the set or coil 15 and arrives for example from the water mains: this produces heating by conduction and therefore achieves an increase in the temperature of the water that arrives from the mains before it is conveyed for example into a boiler 27 or into a water heater 28 or into another appliance for heating sanitary water.

The tank 2 can of course have a chosen capacity, preferably approximately equal to three or more times the amount of water of the mains to be preheated which flows inside the set or coil 15.

The worm screw 18, preferably arranged within the complementarily shaped cylindrical seat 26 and advantageously removable through an appropriately provided slot 20 formed laterally with respect to the tank 2, collects any impurities which might be deposited with the passage of water from the drains 5 of the domestic or industrial appliances.

These impurities or debris are automatically conveyed, by means of the screwing motion of the worm screw 18, at the outlet drain 11, so that they activate, with their weight, the rocker or proximity switch 19, which in turn actuates the second valve 12 with rapid opening and closure to thus generate a flow of water directly toward the sewer.

The device can be applied both to a centralized system of a multi-storied residential building and for each individual system of each apartment of the building and therefore for each dwelling and in summary, therefore, for any sanitary water heating system and space heating system, as shown in FIGS. 4 and 5.

The device can be inserted within the outside wall of the building or at an appropriately provided utility room which is for example adjacent to the boiler or heater.

The advantages that can be achieved by using said device are evident, since the heat of the flow 6 of the water that arrives from the drains 5 of domestic appliances which otherwise would be poured into the sewer is recovered, the flow 6 instead heating the coil 15 which contains the water that arrives from the mains, heating it before it is conveyed for example into the boiler 27 or heater 28.

The device therefore allows to recover the heat of the flow 6 of water that in the background art was instead dispersed directly into the sewer, reducing considerably the difference in temperature between the water that arrives from the mains and the temperature that one wishes to make the water reach for sanitary use, since the water that constitutes the flow 6 that arrives from the drains 5 of the domestic appliances is retained within the tank 2 until it has transferred all or most of its heat to the coil 15 contained therein, while at the same time the cold water that arrives from the mains, by circulating in the coil 15, absorbs by conduction the heat released by the flow 6 of the water that arrives from the drains 5 of the domestic or industrial appliances.

It has thus been shown that the invention has achieved the intended aim and objects, a device having been devised which allows to reduce energy consumption for obtaining hot water to be used in domestic or industrial appliances such as for example dishwashers, washing machines, showers, sinks, et cetera, since the water that enters the heating appliances, such as boilers and water heaters, has a higher temperature by virtue of the presence of the tank into which the flow of water that arrives from the drains of dishwashers, washing machines, showers, sinks or other industrial drains is conveyed, heating the water that arrives from the mains before it is introduced in the heating appliances.

The invention is of course susceptible of numerous modifications and variations, all of which are within the scope of the appended claims. Thus, for example, FIGS. 6 to 10 illustrate solutions which show a device 101 constituted by at least one reservoir or tank 102, provided by means of a box-like container, which has an upper opening which can be closed by means of an inspection cover 129 and is provided internally with an open-top tank 130, which has a V-shaped cross-section with a thermal insulation layer 131 interposed.

The open-top tank 130 is divided internally, by means of a stratification disk or transverse partition 132, into an upper chamber 133 and a lower chamber 134; the partition 132, advantageously made of plastic material, has an axial hole 135 and one or more openings 136 provided with a filtering net.

The device comprises a first intake pipe 103 which is used to recover the hot water from the drains of domestic or industrial appliances and is arranged proximate to the upper end 104 of the tank 102.

The reference numeral 106 designates schematically the flow of water that arrives from the drains of the domestic or industrial appliances.

At the first pipe 103 there is, in a region which is adjacent to said tank, a diverter or a first diverter valve 107 which is suitable to allow either the passage of the flow 106 of the water that arrives from the drains of the domestic or industrial appliances into the tank 102 or its forced or non-forced passage at a second pipe 108 that forms an outlet drain for draining toward the sewer.

The activation of the first diverter valve 107 is actuated by an appropriately provided thermostatic sensor 109, which is arranged upstream thereof and is suitable to check the temperature of the flow 106 of the water that arrives from the drains of the domestic or industrial appliances; as an alternative, a simple diverter 107 is used which drains, in a manner which allows throttling, into the tank 102 by means of an auxiliary pipe 137 and/or into the second pipe 108.

When the temperature of the flow 106 of the water that arrives from the drains of the mentioned appliances is higher than the temperature of the water contained in the tank 102, the first valve 107 forces the passage of the flow 106 directly into the tank by means of the auxiliary pipe 137, the end of which is arranged at the hole 135 formed in the partition 132 for discharge into the lower chamber 134.

Otherwise, it diverts the flow 106 at the second pipe 108 to the sewer.

A tube or a set of tubes or a tube bundle or a coil 115 is arranged inside the tank 102 at the upper chamber 133 and has an intake 116, which is connected to the water mains or to a well, and an outlet 117, which is connected to devices suitable to heat the water, such as for example a boiler 127 or directly into a water heater 128 or in any case in other appliances which produce hot sanitary water.

Inside the tank 102 there are removal means for removing any sediments which might form therein, said removal means being arranged advantageously at the lower end or vertex of the open-top tank 130 and being constituted by a submersed pump 138, which is connected by means of an exit pipe 139 which exits from the hole 135 and from the tank 102 and is connected, at a lower level with respect to the diverter 107, to the second pipe 108 which leads to the sewer.

A third pipe 113 of the overflow type is arranged coaxially to the second pipe 139, draws at the base of the lower chamber 134 and discharges into the second pipe 108 to the sewer.

As an alternative, a floater 140 arranged in the upper chamber 133 is connected to the submersed pump 138; it is possible to associate or not therewith a time-controlled switch.

If the submersed pump is powered by means of a time-controlled switch, said switch activates automatically, for a given time, the submersed pump so as to clean the bottom of the open-top tank of any impurities. The floater in this case ensures the minimum amount of sewer water to ensure that the tube bundle 115 remains always submersed. This solution can be adopted in new structures, or where it is possible to create a sufficient difference in level between the inlet and the outlet of the second pipe 108 for draining toward the sewer.

If only the floater is used, the submersed pump is always powered and is activated and deactivated by the floater when it reaches the maximum and minimum levels. The latter level is adjusted so as to always ensure the complete immersion of the tube bundle 115. It should be noted that during the discharge of the sewer liquid, the bottom of the open-top tank is also cleaned. This solution can be adopted on existing sewer lines, where it is difficult to create a difference in level between the point of connection of the diverter or of the first diverter valve and the connection of the second pipe to the second sewer pipe 108 or where it is necessary to overcome the difference in level among the various sewer collection tanks.

The materials used and the dimensions that constitute the individual components of the invention may of course be more pertinent according to specific requirements.

The various means for performing certain different functions need not certainly coexist only in the illustrated embodiments but can be present per se in many embodiments, including ones that are not illustrated.

The characteristics indicated as advantageous, convenient or the like may also be omitted or be replaced with equivalents.

The disclosures in Italian Patent Application No. TV2007A000052 from which this application claims priority are incorporated herein by reference.

What is claimed is:

1. A heat recovery device, comprising: at least one thermally insulated tank provided with an inlet for recovering warm water from domestic or industrial drains and with an outlet for draining toward a sewer; a first diverter valve for controlling said inlet; a thermostat for controlling said first diverter valve; said inlet being connected to the sewer; a second quick-opening and quick-closing valve for controlling said outlet; a tube or set of tubes provided inside said tank for containing water arriving from water mains or well for being sent to water heating devices; sediment removal means arranged at said tank for removing sediment therefrom; and an overflow outlet provided connected to said tank, wherein said tank is provided with a first intake pipe, for recovering a flow of warm water that arrives from drains of industrial or domestic appliances, said first intake pipe being arranged proximate to an upper end of said tank, said diverter valve being provided at said first pipe, in a region which is adjacent and upstream of the inlet in said tank, and being suitable to allow either passage of water flow that arrives from drains of domestic devices into said tank or forced and non-forced water passage to a second drain pipe for sewer draining, a thermostatic sensor being arranged upstream of said first diverter valve for controlling activation of said first diverter valve and which is suitable to check temperature of water flow that arrives from drains of domestic or industrial appliances in order to cheek whether the checked temperature is at a higher or lower value than a temperature of water contained in said tank; and a thermometer arranged at a trap located at an upper end of said tank for measuring the temperature of the water contained in said tank.

2. The device of claim 1, wherein said at least one tank which is thermally insulated has a box-like shape, a lower end thereof having, in a transverse cross-section, a V-shaped configuration with a vertex constituted by a sleeve that is provided axially with a cylindrical seat.

3. The device of claim 1, wherein said tank comprises an upper and a lower chamber divided by a partition with a discharge hole formed therein, said diverter valve discharging, in a manner which allows throttling, into said tank by means of an auxillary pipe and into said second pipe, a flow of the water that arrives from drains of appliances, and wherein an end of said auxiliary pipe is arranged at said hole formed in said partition for discharge into said lower chamber.

4. The device of claim 1, wherein said tank comprises: an outlet drain which is arranged at said sleeve at one side of said tank and is connected to said second pipe which leads to the sewer; and a second quick-opening and quick-closing valve provided at said second pipe.

5. The device of claim 4, wherein said tank comprises, arranged on a side and proximate to said outlet drain, a third overflow pipe, which is shaped like an inverted letter U, with ends thereof respectively connected to an inside of said tank proximate to a lower end thereof and above said sleeve and to said second pipe which is connected to the sewer in a region downstream of said second valve, and wherein an inspection plug is provided at a curved region of said third pipe.

6. The device of claim 5, comprising any of a tube, tube set, tube bundle and coil provided inside the tank and which has an intake, said intake being connected to water mains or well and being arranged at a slightly higher level than a connection to said tank of said third pipe, and wherein an outlet is provided to said tank, which is connected to devices suitable to heat water that is present in said tube, tube set or coil.

7. The device of claim 3, comprising inside said tank, at said upper chamber, any of a tube, tube set, tube bundle and coil arranged in said tank and which has an intake connected to water mains or well and an outlet connected to appliances suitable to heat water.

8. The device of claim 7, comprising sediment removal means for removing any sediment which might form in said tank, said sediment removal means being arranged at a lower end of said tank, at said cylindrical seat formed in said sleeve in a region which lies below said tube, tube set, tube bundle or coil and a connection of said third pipe.

9. The device of claim 8, wherein said sediment removal means are constituted by a motorized worm screw which is arranged axially with respect to said cylindrical seat, one end of said worm screw being arranged above said outlet drain which is connected, through said second valve, to said second pipe toward the sewer.

10. The device of claim 7, comprising: sediment removal means for removing any sediment which might form in said tank, said sediment removal means being arranged at a lower end or vertex of said tank and being constituted by a submersed pump which is connected, by way of an exit pipe which exits from said hole provided in said partition and from said tank, said second pipe being connected, at a lower level than said diverter, to said second pipe which leads to the sewer; and a third overflow pipe arranged coaxially to said second pipe.

11. The device of claim 9, comprising a control element which is suitable to control said second valve for selective activation of said worm screw at a user's discretion or at preset times, said control element being selectable among a rocker and proximity switch arranged within said outlet drain upstream of said second valve.

12. The device of claim 11, wherein said rocker or proximity switch are suitable to detect presence of any impurities which deposit inside said tank and are conveyed by said worm screw at said outlet drain, said rocker or proximity switch activating said second valve, which opens and closes rapidly to generate accordingly a flow of water in a direction of the sewer so as to pour impurities into the sewer.

13. The device of claim 1, wherein said thermostatic sensor is suitable to detect the temperature of water flow that arrives from drains of domestic appliances and, if the temperature of the water of said flow is lower than or equal to the temperature of the water contained in said tank, provides clearance for actuation of said first diverter valve, which conveys said water flow through said second pipe directly to the sewer.

14. The device of claim 1, wherein said thermostatic sensor is suitable to detect the temperature of the water flow that arrives from drains of appliances and, if the temperature of the water of said flow is higher than the temperature of the water contained in said tank, provides clearance for actuation of said first diverter valve, which conveys said flow directly into said tank through said first pipe.

15. The device of claim 14, Wherein said flow transfers, inside said tank, heat to the water which passes at said tube, tube set or coil and arrives from water mains, which is thus heated by conduction to be then conveyed, after being preheated, into a boiler or water heater or into another appliance for heating sanitary water.

16. The device of claim 15, wherein said tank has a capacity which is at least three times the amount of mains water to be pre-heated, before sending the water to the appliance for heating sanitary water, and which flows inside said tube, tube set or coil.

17. The device of claim 12, wherein said worm screw is arranged within said complementarily shaped cylindrical seat so as to be removable through an appropriately provided slot formed laterally with respect to said tank, and so as to collect any impurities which might deposit with passage of water which arrives from appliance drains, the impurities or debris being conveyed, by way of screwing motion of said worm screw, at said outlet drain so as to activate, by virtue of impurity weight, said rocker or proximity switch, which in turn actuates said second valve with quick opening and closure to thus generate a flow of water directly toward the sewer.

18. The device of claim 1, applied to a centralized system of a multi-storied residential building or to each one of individual system of each apartment.

19. The device of claim 10, comprising a floater arranged in said upper chamber connected to said submersed pump and associated with a time-controlled switch.

20. A heat recovery device, comprising: at least one thermally insulated tank provided with an inlet for recovering warm water from domestic or industrial drains and with an outlet for draining toward a sewer; a first diverter valve for controlling said inlet; a thermostat for controlling said first diverter valve; said inlet being connected to the sewer; a second quick-opening and quick-closing valve for controlling said outlet; a tube or set of tubes provided inside said tank for containing water arriving from water mains or well for being sent to water heating devices; sediment removal means arranged at said tank for removing sediment therefrom; and an overflow outlet provided connected to said tank, wherein said at least one tank which is thermally insulated has a box-like shape, a lower end thereof having, in a transverse cross-section, a V-shaped configuration with a vertex constituted by a sleeve that is provided axially with a cylindrical seat.

\* \* \* \* \*